US008532064B2

United States Patent
Kisigami et al.

(10) Patent No.: US 8,532,064 B2
(45) Date of Patent: Sep. 10, 2013

(54) RADIO COMMUNICATION DEVICE AND ARRIVAL DIRECTION ESTIMATION METHOD

(75) Inventors: Takaaki Kisigami, Kawasaki (JP);
Takashi Fukagawa, Kawasaki (JP);
Yasuaki Yuda, Kawasaki (JP); Keiji Takausaki, Yokohama (JP); Shoji Miyamoto, Sendai (JP)

(73) Assignee: Panasonic Corporation, Osaka (JP)

(*) Notice: Subject to any disclaimer, the term of this patent is extended or adjusted under 35 U.S.C. 154(b) by 541 days.

(21) Appl. No.: 12/979,318

(22) Filed: Dec. 27, 2010

(65) Prior Publication Data
US 2011/0090813 A1 Apr. 21, 2011

Related U.S. Application Data

(62) Division of application No. 11/833,037, filed on Aug. 2, 2007, now Pat. No. 7,860,064, which is a division of application No. 10/430,397, filed on May 7, 2003, now Pat. No. 7,263,083.

(30) Foreign Application Priority Data

May 7, 2002 (JP) .................................. 2002-132069
Jul. 29, 2002 (JP) .................................. 2002-220302

(51) Int. Cl.
*H04Q 7/00* (2006.01)
(52) U.S. Cl.
USPC ........ 370/334; 370/335; 370/328; 455/562.1; 375/147; 342/378
(58) Field of Classification Search
USPC ...... 370/334, 335, 328; 455/562.1; 375/147; 342/378
See application file for complete search history.

(56) References Cited

U.S. PATENT DOCUMENTS 6,310,704 B1 10/2001 Dogan et al.
6,347,234 B1* 2/2002 Scherzer .................... 455/562.1
(Continued)

FOREIGN PATENT DOCUMENTS

EP 1028544 A1 6/2000
EP 2001-309424 A 11/2001
(Continued)

OTHER PUBLICATIONS

Inoue, Takashi, et al., "Two-Dimensional Rake Reception Scheme for DS/CDMA Systems in Beam Space Digital Beam Forming Antenna Configuration", IEICE Trans. Commun., Jul. 1998, vol. E81-B, No. 7, pp. 1374-1383.

(Continued)

Primary Examiner — Danh Le
(74) Attorney, Agent, or Firm — Pearne & Gordon LLP

(57) ABSTRACT

A receiver having an array antenna estimates arrival directions of multiple paths that arrive with an angular spread. Consequently, arrival direction estimation accuracy can be ensured without increasing throughput even if the power every path is low by estimating an average arrival direction of an entire set of multiple paths having the angular spread from a result of one angular spectrum by multiple correlation operation units that perform mutual correlation operations with pilot signals for baseband signals received by the array antenna, a path detection unit that detects multiple arrival path receiving timings by generating a delay profile based on output of each of the correlation operation units, a path correlation value synthesis unit that synthesizes a correlation operation value calculated in the multiple correlation operation units and an arrival direction estimation unit that collectively estimates multiple path arrival directions using output of the path correlation value synthesis unit.

5 Claims, 6 Drawing Sheets

(56) References Cited

U.S. PATENT DOCUMENTS

| | | |
|---|---|---|
| 6,404,759 B1 | 6/2002 | Shoji |
| 6,493,379 B1 | 12/2002 | Tanaka et al. |
| 6,509,872 B2 | 1/2003 | Ishii et al. |
| 6,580,394 B2 | 6/2003 | Wang et al. |
| 6,647,276 B1 * | 11/2003 | Kuwahara et al. ......... 455/562.1 |
| 6,804,215 B1 | 10/2004 | Tanoue |
| 6,882,681 B2 | 4/2005 | Sano |
| 7,042,862 B1 | 5/2006 | Hirade |
| 7,095,984 B2 | 8/2006 | Hoshino |
| 7,298,774 B2 * | 11/2007 | Miyata et al. ................. 375/147 |
| 7,379,020 B2 * | 5/2008 | Tsuchihashi et al. ......... 342/417 |
| 7,450,067 B2 * | 11/2008 | Xin ............................... 342/378 |
| 2001/0048389 A1 | 12/2001 | Nakagawa |
| 2002/0018517 A1 * | 2/2002 | Hara ............................. 375/147 |
| 2002/0032015 A1 | 3/2002 | Kitakado et al. |
| 2002/0048286 A1 | 4/2002 | Brunel |
| 2002/0057660 A1 | 5/2002 | Park et al. |
| 2002/0061051 A1 | 5/2002 | Kitahara |
| 2002/0072343 A1 | 6/2002 | Miyatani |
| 2002/0126045 A1 | 9/2002 | Kishigami et al. |
| 2002/0135514 A1 | 9/2002 | Yoshida |
| 2002/0181561 A1 | 12/2002 | Sano |
| 2003/0012267 A1 | 1/2003 | Jitsukawa et al. |
| 2003/0086482 A1 | 5/2003 | Shimizu et al. |
| 2003/0100344 A1 * | 5/2003 | Garmonev et al. ........... 455/562 |
| 2004/0012525 A1 | 1/2004 | Yuda et al. |

FOREIGN PATENT DOCUMENTS

| | | |
|---|---|---|
| EP | 1161001 A2 | 12/2001 |
| GB | 2318705 A | 4/1998 |
| JP | 03-194483 A | 8/1991 |
| JP | 2000-059278 A | 2/2000 |
| JP | 2001-196835 A | 7/2001 |
| JP | 2002-026787 A | 1/2002 |
| JP | 2002-084216 A | 3/2002 |
| JP | 2002-084217 A | 3/2002 |

OTHER PUBLICATIONS

Tsutsui, Masafumi, et al., "W-CDMA adaptative array antenna receiver with 2_D path search and its performance on RACH signals", Proceedings of the 2000 Communications Society Conference of IEICE, Sep. 7, 2000, p. 356, B-5-68.

* cited by examiner

FIG. 3
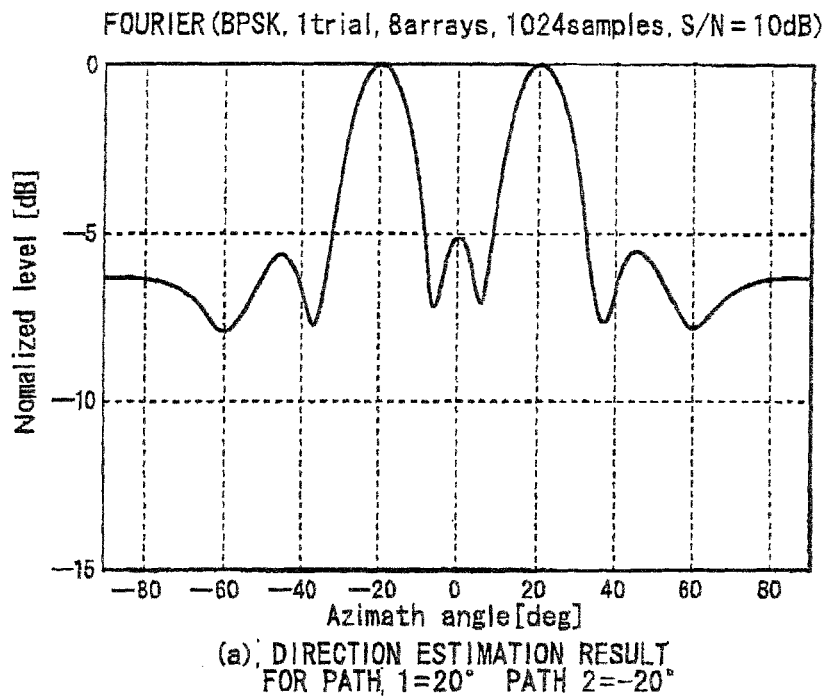
(a) DIRECTION ESTIMATION RESULT
FOR PATH 1=20°, PATH 2=-20°
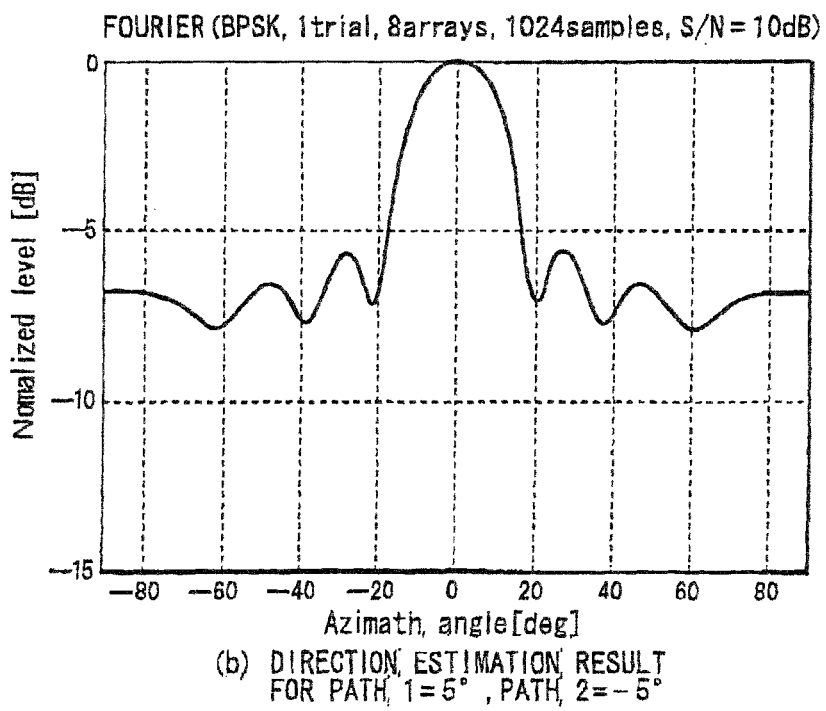
(b) DIRECTION ESTIMATION RESULT
FOR PATH 1=5°, PATH 2=-5°

RADIO COMMUNICATION DEVICE AND ARRIVAL DIRECTION ESTIMATION METHOD

This is a divisional of U.S. patent application Ser. No. 11/833,037, filed Aug. 2, 2007, which will issue as U.S. Pat. No. 7,860,064, on Dec. 28, 2010, which is a divisional of U.S. patent application Ser. No. 10/430,397, filed May 7, 2003, now U.S. Pat. No. 7,263,083, issued Aug. 28, 2007, such applications claiming the benefits under §119 of Patent Application No. 2002-220302 filed in Japan on Jul. 29, 2002 and of Patent Application No. 2002-132069 filed in Japan on May 7, 2002, contents of each of which are incorporated herein.

BACKGROUND OF THE INVENTION

1. Field of the Invention

The present invention relates to an arrival path direction estimation means in a radio communication device having an array antenna used in a digital radio communication system and a directional control means based on the arrival path direction estimation means.

2. Description of Prior Art

The signal a radio communication device receives is interfered with various signals and deteriorates receiving quality. An adaptive array antenna is known as an art that suppresses this interference and powerfully receives only the signal arriving from a desired direction. The adaptive array antenna can powerfully receive only the signal arriving from the desired direction by adjusting a weighting coefficient multiplying a receiving signal (hereinafter, this weighting coefficient is referred to as 'weight') and adjusting an amplitude and a phase applied to the receiving signal.

Further, the radio communication device requires a path timing detection circuit (hereinafter referred to as path search circuit) that detects a receiving timing of a desired signal at reception. The communication radio device can detect a more accurate receiving timing and estimate an arrival direction using a processing result at path search by combining this path search circuit with an adaptive array antenna art.

A conventional adaptive array antenna device having the path search circuit is disclosed in Japanese Unexamined Patent Application No. Hei 14 (2002)-84216. FIG. 1 is a block diagram showing the configuration of a receiver of a direct spread CDMA system having the conventional adaptive array antenna. The operation of the outline is described below with reference to FIG. 1. All signals of an array antenna 51 having multiple antenna elements 51-1 to N are input to a searcher 50 in FIG. 1. In the searcher 50, after mutual correlation operation processing with a known signal for every antenna is performed in a correlation processing unit 52, all the signals are input to an inter-antenna correlation estimation unit 54 installed in parallel to an antenna synthesis path timing detection unit 53. After the antenna synthesis path timing detection unit 53 converts a complex correlation value signal to electric power following the correlation processing of each antenna, high accurate path timing detection is implemented even in a low SNR (signal-to-noise ratio) by synthesizing both. Moreover, the inter-antenna correlation estimation unit 54 estimates an inter-antenna correlation value using the complex correlation value signal of each antenna after the correlation processing. The interface between an array antenna receiving signal processing unit 55 and the searcher 50 provides a signal that corresponds to the inter-antenna correlation value in addition to a path timing signal. An adaptive array receiving unit sets an inter-antenna correlation estimate obtained from a searcher as an initial value of a weight update unit.

In the conventional receiver having the aforementioned configuration, however, a chip rate is speeded up in the direct spread CDMA system to implement a high-speed transmission rate. Consequently, since the time resolution of an arrival path increases and the electric power per path decreases, such a problem that the arrival direction estimation accuracy per path cannot be secured is caused. When a communication device does not presuppose high-speed travel, the accuracy increases if a correlation value is made average over multiple frames, but the follow-up of an array weight deteriorates. Moreover, for short packet transmission, such a problem that the correlation value cannot be made average over sufficient time intervals is also caused.

The present invention is made in consideration of such a point, and the first object is to estimate multiple path arrival directions and estimate the average arrival direction of the entire path after synthesizing the inter-antenna correlation value obtained for every path in a radio communication device having an array antenna.

Further, the second object of the present invention is to provide a radio communication device that can form a directional beam in the average arrival direction of multiple paths arriving with an angular spread even if the received power for every path is low.

Further, the third object of the present invention is to provide a radio communication device that secures communication of stable quality without deteriorating the follow-up of directional receiving.

SUMMARY OF THE INVENTION

A radio communication device of the present invention includes, as the basic configuration, an array antenna composed of multiple antenna elements, multiple radio receiving units that frequency-convert high frequency signals received by each of the antenna element of the array antenna, orthogonally detect the signals, and output baseband signals, multiple correlation operation units that perform mutual correlation operations with predetermined signals for each of the baseband signals, a path detection unit that detects multiple arrival path receiving timings by generating a delay profile based on output of each of the correlation operation units, a path correlation value synthesis unit that synthesizes correlation operation values calculated at the multiple correlation units and an arrival direction estimation unit that collectively estimates multiple path arrival directions using output of the path correlation value synthesis unit.

The aforementioned configuration allows the radio communication device to have an action that can estimate the average arrival direction of an entire set of multiple paths having an angular spread.

The present invention is also provided with an arrival direction estimation unit that obtains one angular spectrum using the output of the path correlation value synthesis unit and detects a peak location of the angular spectrum, and has an action that can greatly decrease an amount of operation of arrival direction estimation for multiple paths.

The present invention is also provided with an arrival direction estimation unit that obtains one angular spectrum using the output of the path correlation value synthesis unit and detects the peak location and a peak level of the angular spectrum, and, if there are two or more of peak locations, specifies the peak location of the peak level within a predetermined range from a maximum peak location and a maximum peak level as an arrival direction candidate angle and specifies the arrival direction candidate angle in which an absolute value of an inner product between a vector having the correlation operation value calculated in the multiple correlation operation units as an element and a directional vector in a peak location direction previously obtained in a spatial arrangement of an array antenna is maximized at an arrival path receiving timing as an arrival direction estimate per path, and has an action that can estimate multiple path arrival directions corresponding to even the case where the angular spread is larger than the beam width of the array antenna.

The present invention is also provided with a path detection unit that detects multiple arrival receiving timings by generating a delay profile after making the output of each of the correlation operation units average over a predetermined count, and has an action that can increase path detection accuracy.

The present invention is also provided with a path correlation value synthesis unit that synthesizes the correlation operation value calculated in a correlation operation unit between multiple arrival path receiving timings and predetermined timings adjacent to them, and has an action that can increase direction estimation accuracy by estimating an arrival direction using the arrival direction information about more paths.

The present invention is also provided with a path correlation value synthesis unit that generates a correlation matrix R expressed as $$R = V_1(V_1)^H + V_2(V_2)^H + \blacksquare + V_N(V_N)^H$$

where N paths are detected in a path detection unit, a column vector having the correlation operation value calculated in the correlation operation unit for each antenna element at a k-th arrival path receiving timing as an element is specified as Vk and H is specified as a complex conjugate transposed operator, and has an action that can estimate the average arrival direction of an entire set of multiple paths having an angular spread.

The present invention is also provided with a path correlation value synthesis unit that generates a correlation vector z expressed as $$z = V_{11}(V_1)^H + V_{21}(V_2)^H + \blacksquare + V_{N1}(V_N)^H$$

where N paths are detected in the path detection unit, a column vector having the correlation operation value calculated in the correlation operation unit for each antenna element at the k-th arrival path receiving timing as the element is specified as Vk and Vkm is specified as an m-th element of the column vector Vk and H is specified as the complex conjugate transposed operator, and has an action that is easier than the direction estimation using a correlation matrix but can decrease an amount of operation.

The present invention is also provided with an arrival direction estimation per path unit that estimates the arrival direction for each of multiple arrival path receiving timings from the correlation operation value calculated in multiple correlation operation units at the multiple arrival path receiving timings, an angular spread calculation unit that calculates an angular spread of an entire arrival path from a result of the arrival direction estimation per path in the arrival direction estimation per path unit and an arrival direction estimation system estimation unit that selects and outputs either the direction estimation result of an arrival direction estimation unit that collectively estimates multiple path arrival directions or the direction estimation result of the arrival direction estimation per path unit based on a difference between an output value and a predetermined value of the angular spread calculation unit, and has an action that can select the optimum direction estimation method in accordance with the angular spread based on the direction estimation result per path.

The present invention is also provided with an arrival direction estimation per path unit that estimates an arrival direction for each of the multiple arrival path receiving timings from the correlation operation value calculated in multiple correlation operation units at the multiple arrival path receiving timings, an angular spread calculation unit that calculates the angular spread of the entire arrival path from a ratio of a maximum eigenvalue of a correlation matrix generated in a path correlation value synthesis unit and a second largest eigenvalue, and an arrival direction estimation system selection unit that selects and outputs either the direction estimation result of an arrival direction estimation unit that collectively estimates multiple path arrival directions or the direction estimation result of the arrival direction estimation per path unit based on the difference between the output value and predetermined value of the angular spread calculation unit, and has an action that can select the optimum direction estimation method in accordance of the angular spread based on the size of the eigenvalue of a correlation matrix.

The present invention is also provided with an arrival direction estimation per path unit that estimates an arrival direction for each of multiple arrival path receiving timings from the correlation operation value calculated in multiple correlation units at the multiple arrival path receiving timings, an angular spread estimation selection unit that calculates the angular spread of the entire arrival path from a peak location that appears on an angular spectrum generated in an arrival direction estimation unit and an arrival direction estimation system selection unit that selects and outputs either the direction estimation result of the arrival direction estimation unit that collectively estimates multiple arrival directions or the direction estimation result of the multiple path arrival direction estimation units based on the difference between the output value and predetermined value of the angular spread calculation unit, and has an action that can select the optimum direction estimation method in accordance with the angular spread based on angular spectrum information.

The present invention is also provided with a path detection unit that detects multiple arrival path receiving timings that exceeds the maximum number of fingers in which rake synthesis is received, an arrival direction estimation per path unit that estimates the arrival direction for each of the multiple arrival path receiving timings from the correlation operation value calculated in multiple correlation operation units at the multiple arrival path receiving timings, an effective path selection unit that selects a path within the maximum number of fingers in which the rake synthesis is performed from received power when directional receiving is performed in the arrival direction per path, and an angular spread calculation unit and an arrival direction estimation selection unit that specify the output of the effective path selection unit as input instead of the output of the arrival direction estimation per path unit, and has an action that can improve the effective path detection performance.

The present invention is also provided with an arrival direction estimation per path unit that estimates an arrival direction per path using the correlation operation value calculated in the correlation operation unit at a sample timing adjacent before and after an arrival path receiving timing in addition to the arrival path receiving timing, and has an action that can improve arrival direction estimation accuracy per path.

The present invention is also provided with an arrival direction estimation per path unit that estimates an arrival direction per path by calculating a correlation matrix using the correlation operation value calculated in a correlation operation unit at a sample timing adjacent before and after an arrival path receiving timing in addition to the arrival path receiving timing, and has an action that can improve arrival direction estimation accuracy per path.

The present invention is also provided with an arrival direction estimation per path unit that calculates a correlation matrix using the correlation operation value calculated in a correlation operation unit at a sample timing adjacent before and after an arrival direction path receiving timing in addition to the arrival path receiving timing and estimates an arrival direction per path using the correlation matrix to which space smoothing processing is applied, and has an action that can improve arrival direction estimation accuracy per path.

The present invention is also provided with multiple path separation units that separate an arrival path from baseband signals per arrival path receiving timing, multiple path receiving beam formation units that form a directional beam in a direction estimated in an arrival direction estimation unit per separated arrival path and a path synthesis unit that synthesizes and receives output signals of the multiple path receiving beam formation units, and has an action that enables directional receiving by forming the optimum receiving beam per path.

The present invention is also provided with a path receiving beam formation unit that forms a directional beam including null formation using a correlation matrix R that is the output of a path correlation value synthesis unit and information about the arrival path direction estimated by an arrival direction estimation unit, and has an action that enables directional receiving by forming the optimum receiving beam for every path.

The present invention is also provided with a path receiving beam formation unit that forms a directional beam using a path receiving weight composed of a product between an inverse matrix of the correlation matrix R that is the output of a path correlation value synthesis unit and a directional vector in an array antenna of an arrival path direction estimated by an arrival direction estimation unit, and the received directional beam has an action that allows the main beam to face toward the path arrival direction and enables a null to be formed in the interference wave direction.

The present invention is also provided with a path receiving beam formation unit that forms a directional beam using a path receiving weight composed of the product between the inverse matrix of the correlation matrix R that is the output of a path correlation value synthesis unit and a column vector having the correlation operation value calculated in the correlation operation unit of each of the antenna elements at an arrival path receiving timing as an element, and the received directional beam has an action that allows the main beam to face toward the path arrival direction and enables a null to be formed in the interference wave direction.

The present invention is also provided with a directional beam sending unit that forms and sends a directional beam in a direction estimated by an arrival direction estimation unit, and has an action that can send the directional beam whose directivity is selected in a desired user direction.

The present invention is also provided with a directional beam sending unit that forms and sends a directional beam for each of the arrival path arrival directions estimated in an arrival direction estimation unit, and has an action that can form and send the directional beam in an arrival path direction among the arrival directions of arrival paths estimated in the arrival direction estimation unit.

The present invention is also provided with a directional beam sending unit that forms and sends a directional beam only in a path direction of maximum received power among the arrival path arrival directions estimated by an arrival direction estimation unit, and has an action that can send the directional beam whose directivity is selected in a desired user direction.

The present invention is also provided with an arrival direction estimation method that collectively estimates multiple path arrival directions by receiving multiple I/Q baseband signals obtained by frequency-converting multiple high frequency signals that are received by an array antenna composed of multiple antenna elements and orthogonally detecting them respectively by multiple radio receiving units, calculating a correlation operation value with known signals at each of detected multiple arrival path receiving timings, obtaining one angular spectrum using a path correlation value synthesis signal with which the calculated multiple correlation operation values are synthesized and detecting a peak location and a peak level of the angular spectrum, and has an action that can estimate the average arrival direction of multiple paths having an angular spread.

As described above, according to the present invention, the radio, communication device having an array antenna can estimate multiple path arrival directions by the calculation of a one-time angular spectrum for multiple paths and can reduce throughput as compared with the case where the arrival direction is estimated individually. Further, since the average arrival direction of multiple paths that arrive with an angular spread is estimated, the arrival direction can be estimated with stable accuracy even if there is a fading fluctuation when the received power for every path is low.

The aforementioned objects and advantages of the present invention will be made clearer according to the following embodiments described with reference to the drawings.

BRIEF DESCRIPTION OF THE DRAWINGS

Preferred embodiments of the present invention will be described in detail based on the followings, wherein:

FIG. 3 is a drawing showing an angular spectrum calculation result in an arrival direction estimation unit according to the embodiment 1 of the present invention;

DESCRIPTION OF THE PREFERRED EMBODIMENTS

Preferred embodiments of the present invention are described below with reference to FIGS. 2 to 6.

Embodiment 1

Figure 1:
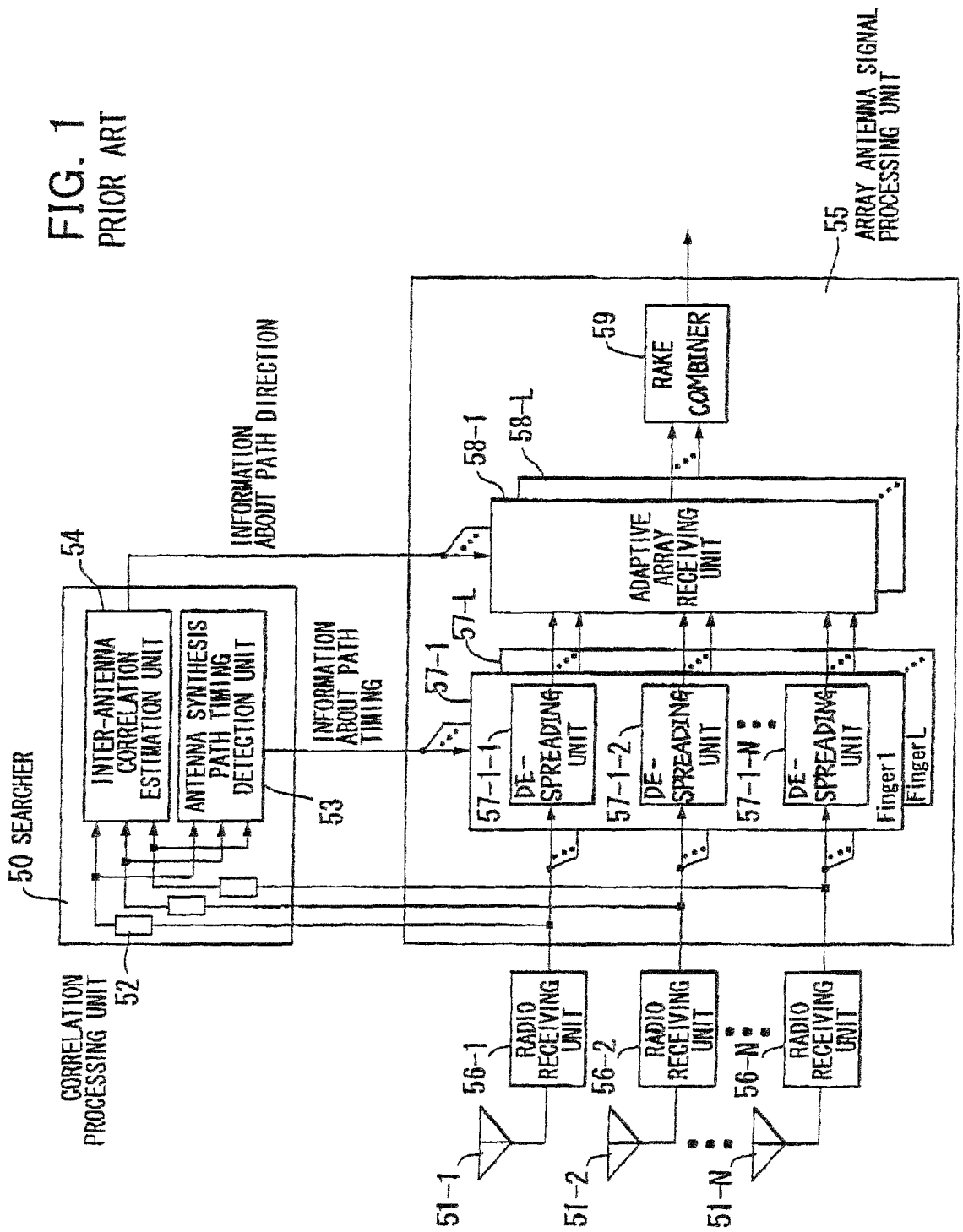
FIG. 1 is a block diagram showing the configuration of a conventional radio communication device.
Figure 2:
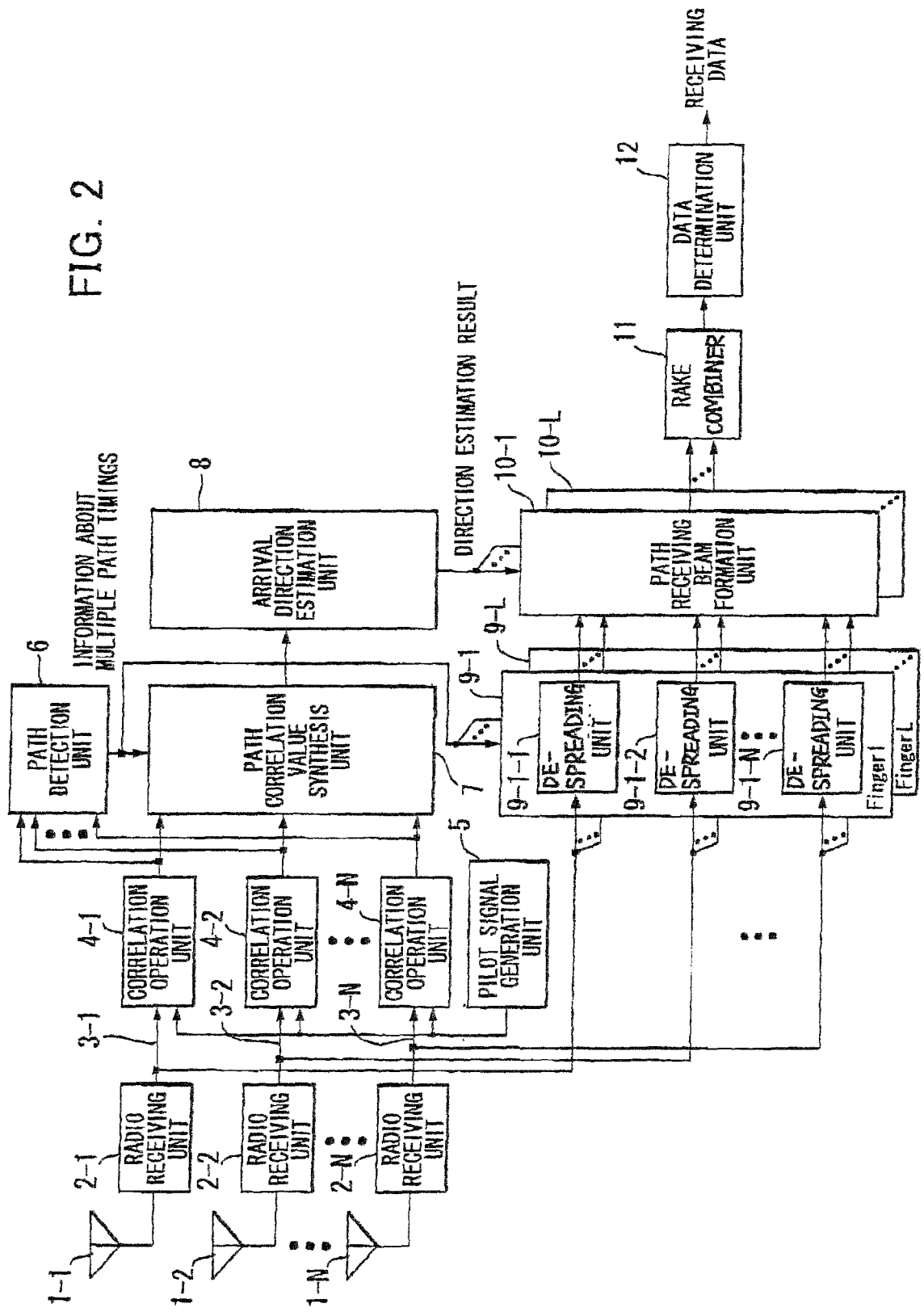
FIG. 2 is a drawing showing the configuration of the radio communication device according to an embodiment 1 of the present invention.

FIG. 2 is a block diagram showing the configuration of a radio communication device according to an embodiment 1 of the present invention. The radio communication device shown in FIG. 2 applies high frequency amplification, frequency conversion, orthogonal detection and A/D conversion sequentially to high frequency signals received by antenna elements 1-1 to N constructing an array antenna 1 in radio receiving units 2-1 to N installed in each of the antenna elements 1-1 to N, and generates baseband signals 3-1 to N composed of signals I and Q. However, N is the number of antenna elements.

The baseband signals 3-1 to N are input to each of correlation operation units 4-1 to N in response to each signal respectively. A pilot signal generation unit 5 generates a known signal (hereinafter referred to as a pilot signal) embedded previously in a receiving signal. The correlation operation units 4-1 to N perform a mutual correlation operation with the pilot signal. For example, for a W-CDMA communication system, after de-spreading is performed with a scrambling code and a channelization code, a correlation operation with the pilot signal embedded in every frame is performed. Here, the pilot signal is r(s). However, s=1 to Np and Np is the number of symbols for the pilot signal. The m-th correlation operation unit 4-$m$ is expressed as the m-th baseband signal 3-$m$ (hereinafter referred to as Xm(t). Where, t indicates a sample timing). On the other hand, the correlation operation shown in (Formula 1) calculates a pilot correlation value hm(p) of each sample timing by changing a sample timing p that starts the correlation operation from 1 to Ts only by the number of times that corresponds to the number of samples Ts within the time range in which a path search is performed. No is the number of over-samples for a symbol. In addition, * indicates a complex conjugate. Accordingly, the pilot signal correlation value hm(p) in the m-th antenna element 1-$m$ whose sample timing p is the starting point of the correlation operation is obtained. The aforementioned operation is performed for the baseband signals 3-1 to N received by all the antenna elements 1-1 to N.

$$h_m(p) = \sum_{s=1}^{N_p} x_m(p + No \cdot (s-1)) r^*(s) \qquad \text{(Formula 1)}$$

A path detection unit 6 generates a delay profile based on the pilot signal correlation value hm(p) obtained by each of the correlation operation units 4-1 to N, selects high-level power paths of the predetermined number L, and outputs a selected path timing. Where, p=1 to Ts and m=1 to N. The delay profile is generated using the method of 1) composing the absolute value or square of the pilot signal correlation value hm(p) obtained by each of the antenna elements 1-1 to N for one timing or 2) generating multiple delay profiles by multiplying the pilot correlation value of the same timing by the weight on which a directional beam is formed, then adding both and obtaining the absolute value or square, and moreover synthesizing them.

A path correlation value synthesis unit 7 outputs a correlation matrix R that synthesizes a path correlation value as shown in (Formula 2) when the k-th path timing information is expressed as pk among the detected L paths. Here, k is a natural number of 1 to L and H indicates a complex conjugate transposed operator. Further, Vk indicates a correlation vector in which a pilot correlation value hm(pk) obtained by the correlation operation units 4-1 to N in the k-th path detection timing pk is an element as shown in (Formula 3). (m is a natural number of 1 to N.) However, T indicates a vector transposed operator. Since the correlation vector Vk contains phase information that results in the spatial arrangement of the array antenna 1, an arrival path direction can be estimated even only from (Formula 3). In this embodiment, however, the average arrival direction of multiple paths can be estimated by generating a correlation matrix in which the correlation vector Vk obtained from each path is synthesized. When the multiple paths arrive with an angular spread, the arrival direction information of those multiple paths is vector-added even if the electric power per path is low. Subsequently, because the direction estimation is performed, this configuration can secure arrival direction estimation accuracy even under a fading fluctuation.

$$R = \sum_{k=1}^{L} V_k V_k^H \qquad \text{(Formula 2)}$$

$$V_k = [h_1(p_k) h_2(p_k) \cdots h_N(p_k)]^T \qquad \text{(Formula 3)}$$

The over-sample processing is performed for a symbol rate or chip rate, the path detection unit 6 stores the phase information that results in the spatial arrangement of the array antenna 1 to some extent even for the sample adjacent to the detected arrival path receiving timing, and may also generate a correlation matrix to which this information is added. A correlation matrix R2 at that time is shown in (Formula 4). In (Formula 4), a correlation matrix in which a correlation vector having the predetermined number of samples T adjacent before and after is added to the k-th arrival path receiving timing pk is calculated, and the correlation vector of the L×(2T+1) timing is added to all paths. Accordingly, an amount of operation increases, but even if the number of paths is small, the number of ranks of the correlation matrix is easy to reach the full rank and the application of a high resolution arrival direction estimation algorithm becomes easy. Further, even if the arrival path power is low, the estimation accuracy improves by adding a correlation vector in an adjacent timing.

$$R_2 = \sum_{k=1}^{L} \sum_{n=-T}^{T} u_k^n (u_k^n)^H \qquad \text{(Formula 4)}$$

$$u_k^n = [h_1(p_k+n) h_2(p_k+n) \cdots h_N(p_k+n)]^T \qquad \text{(Formula 5)}$$

A arrival direction estimation unit 8 calculates an angular spectrum by varying θ in the arrival direction estimation evaluation function F (θ) shown in (Formula 6) in the predetermined angle step Δθ and detects the peak direction having the predetermined number Nd (Nd≧1) in the descending order of the peak level of an angular spectrum, then specifies an arrival direction estimate. However, a (θ) is a directional vector that depends on the element arrangement of the array antenna 1. For example, it can be expressed as shown in (FIG. 7) for an equi-interval linear array having an element space d. Here, λ is a wavelength of a carrier wave and θ specifies the array normal direction as the direction of 0°. Further, H is a complex conjugate transposed operator.

$$F(\theta) = |a(\theta)^H R a(\theta)| \qquad \text{(Formula 6)}$$

$$a(\theta) = \begin{bmatrix} 1 \\ \exp\{-j2\pi d \cdot 1 \cdot \sin\theta/\lambda\} \\ \vdots \\ \exp\{-j2\pi d \cdot (N-1) \cdot \sin\theta/\lambda\} \end{bmatrix} \quad \text{(Formula 7)}$$

FIG. 3 shows an angular spectrum calculation result when the number of array elements N=8 and the number of paths L=2 (equi-level 2 path condition). FIG. 3 (a) is the result of the arrival angle θ1 of path 1=20° and the arrival angle θ2 of path 2=−20°, and FIG. 3 (b) is the result of θ1=5° and the arrival angle θ2 of path 2=−5'. The arrival direction estimation shown in (Formula 6) is called a beam former method. When multiple path arrival angles are separated more sufficiently than the beam width of the array antenna 1 formed according to array weight W=a(θ), the peak for each path direction can be detected (FIG. 3a). Further, when the multiple path arrival angles are close to one after another (FIG. 3b), an angular spectrum having the smaller number of peaks than the number of paths is obtained. The peak direction at this case is a steering beam direction in which the composite power of multiple paths is maximized.

In the calculated angular spectrum, 1) when the peak location is one (=θ1), all path arrival direction estimates are θ1. 2) when there are multiple peak locations, the peak location ■1 of the maximum level and the peak locations φ2, φ3, ... φM of the peak level within the predetermined range from the maximum level are candidates of the path arrival direction estimate. Here, M≦L. It is determined from (Formula 8) expressed using the directional vector a (θ) and the correlation vector Vk that the k-th path belongs to any of multiple peak locations φs. However, s is a natural number of 1 to M. As a result of the determination in (Formula 8), the path direction to which the maximum value applies is the arrival direction estimate θk of the k-th path.

$$\theta_k = \max_{1 \leq s \leq M} |a(\phi_s)^H V_k| \quad \text{(Formula 8)}$$

The aforementioned operation enables the arrival path direction estimation. The directional receiving control for an arrival path is described below as an example in which the CDMA communication system is used.

De-spreading units 9-1 to L perform de-spreading for L multi-path components (hereinafter referred to as the first path to the L-th path) that arrive at each of the antennas 1-1 to N. That is, the de-spreading units 9-1 to L perform the de-spreading in accordance with each path receiving timing that arrives at the antennas 1-1 to N based on the path timing information detected by the path detection unit 6. Accordingly, in de-spreading units 9-p-1 to N for a path p distributed and connected from the antennas 1-1 to N for the number of paths, the p-th path signal received by the antennas 1-1 to N is ejected respectively. However, p=1 to L and N is the number of antenna elements.

Path receiving beam formation units 10-1 to L form directivity as the main beam of the antenna 1 in the arrival direction estimation unit 8 based on a direction estimation result. That is, a path receiving formation unit 10-p generates a beam weight vector Wp that makes the directivity face toward the p-th path arrival direction estimate direction θp and outputs an array composite signal yp(t) that is a result of the p-th path array receiving signal vector xp(t) that is the output of the de-spreading units 9-p-1 to N being multiplied by the beam vector Wp in (Formula 9). However, p=1 to L. As a beam weight vector Wk, for example, the directional vector a (θp) in (Formula 7) or the Chebyshev beam are used.

$$y^p(t) = W_k^H x^p(t) \quad \text{(Formula 9)}$$

A Rake combiner 11 multiplies array composite signals y1 (t) to yL (t) for the first to L-th paths by complex conjugate values (h1')* to (hM')* respectively. After channel fluctuation values h1 to hM are compensated, the signals are rake combined. The rake combined signal is determined for a code by a data determination unit 12. Accordingly, receiving data is obtained.

As described above, according to this embodiment, based on the estimation result of the arrival direction estimation unit 8, the path receiving beam formation unit 10 can receive a signal by making the directivity of the array antenna 1 common to a path face toward the direction in which the composite power of multiple paths that arrive from the adjacent direction is maximized. Accordingly, even if the received power for every path is low, the average arrival direction of multiple paths that arrive with an angular spread can be estimated with accuracy even for the presence of a fading fluctuation. When the installation site of the array antenna 1 is sufficiently higher than the height of a peripheral building, generally, the angular spread of an arrival wave is assumed to be equal to or less than about 10°. Under such an environment, the angular spectrum calculated in the arrival direction estimation unit 8 appears as if it had one peak. Further, when the installation site of the array antenna 1 is lower than the height of the peripheral building, the angular spread of an arrival wave becomes larger, and multiple peaks may appear in the angular spectrum calculated in the arrival direction estimation unit 8. Even in such a case, because the optimum peak direction is determined from the multiple peaks per path and directional receiving is enabled for each path, favorable estimation accuracy is obtained regardless of the size of the angular spread. The deterioration of communication quality can be prevented by performing the directional receiving based on such a stable direction estimation result. Further, because a series of these operations can be performed by estimating multiple path arrival directions based on the one-time calculation of the angular spectrum for the multiple paths, throughput can be reduced greatly as compared with the case where the arrival direction is estimated individually.

Further, because this embodiment estimates an arrival direction using a pilot signal correlation value obtained in the path detection process, processing can be shared and the operation amount as the entire device can be reduced. Further, even when there is a high power interference wave, because the pilot signal correlation value is reduced if the arrival path timing is not identical, the interference wave is suppressed.

The arrival direction estimation unit 8 in this embodiment estimates a direction using the beam former method. Eigenvalue analysis methods, such as the MUSIC and ESPRIT methods whose information is disclosed in "Adaptive Signal Processing by Array Antennas" (Science Press, Inc.) by Kikuma and a high resolution method of an arrival direction estimation, such as the Capon Method including the inverse matrix operation of a correlation matrix, can apply to the correlation matrix R of the output of the path correlation value synthesis unit 7 shown in (Formula 2) or (Formula 4). When the number of array paths is smaller than the number of array elements, however, since the case is possible where the number of ranks of the correlation matrix that is the output of the path correlation value synthesis unit 7 does not reach the full rank, an adaptive joint use with the beam former method is considered in accordance with the number of ranks or the number of paths. Further, when the configuration of the array antenna 1 is equi-interval linear array arrangement, the arrival direction estimation processing in a beam space in which a directional vector is put into a real number can be applied in the same way by multiplying the correlation matrix obtained in the path value synthesis unit 7 by space smoothing processing or a unitary conversion matrix.

Further, when these high resolution methods of the arrival direction estimation are used, the arrival direction estimation resolution becomes larger than the beam width of the array antenna 1. Even if the resolution of a peak location interval increases more than required, however, the receiving performance does not change greatly. Accordingly, the operation of the arrival direction estimation unit 8 may also be performed as described below. That is, as the operation when there are multiple peak locations in the angular spectrum calculated in the arrival direction estimation unit 8, the peak location $\phi\theta 1$ of the maximum level and the peak level within the predetermined range from the maximum level, and moreover, the peak locations $\phi 2, \phi 3, \ldots \phi M$ in which the peak location interval is separated more than the beam width of the array antenna 1 in the peak location are specified as candidates of the path arrival direction estimate. As a result of the determination shown in (Formula 8), the path direction to which the maximum value applies is the k-th path arrival direction estimate $\theta k$.

To reduce the amounts of operation of the path correlation value synthesis unit 7 and the arrival direction estimation unit 8, the path correlation value synthesis unit 7 may calculate a correlation vector r shown on the first line of the correlation matrix shown in (Formula 2) or (Formula 4) and the arrival direction estimation unit 8 may also calculate a direction by calculating an angular spectrum using the arrival direction estimation evaluation function expressed by the absolute value $|r^* \blacksquare a(\theta)|$ of the inner product between the correlation vector r and the directional vector $a(\theta)$ of the antenna 1.

In this embodiment, the path receiving formation units 10-1 to L form a beam whose main beam faces toward the estimation direction based on the result of the arrival direction estimation unit 8, but they may also form a null using the correlation matrix R that is the output of the path correlation value synthesis unit 7 and the directional vector $a(\theta)$ of the path direction. In this case, the receiving weight Wk for the k-th path is shown in (Formula 10) using the arrival direction $\theta k$ of the k-th path. Otherwise, it may also be generated as shown in (Formula 11) using the correlation vector Vk generated from the pilot correlation value of the k-th path. However, Vk is obtained from (Formula 3).

$$W_k = R^{-1} a(\theta_k) \quad \text{(Formula 10)}$$

$$W_k = R^{-1} V_k \quad \text{(Formula 11)}$$

In the path detection unit 6, after the output of each of the correlation operation units 4-1 to N is made average over a predetermined count (predetermined frame period), multiple arrival path receiving timings may also be detected by generating a delay profile. In this case, the follow-up for a path fluctuation deteriorates, but the path detection accuracy can be increased and the robustness of the path detection operation can be improved.

Further, in this embodiment, a base station device used in a communication system that uses a CDMA system as a multiple system was described, but the same shall not be limited to this device. The present invention can also apply to the base station device used in a communication system that uses a multiple system of a TDMA system or an OFDM system.

Further, the aforementioned embodiment is described assuming that multiple antennas are arranged linearly at half-wave length intervals of a carrier wave. The same shall not be limited to this embodiment, however. The present invention can apply to all the base station devices that have multiple antennas and form directivity.

Embodiment 2

Figure 4:
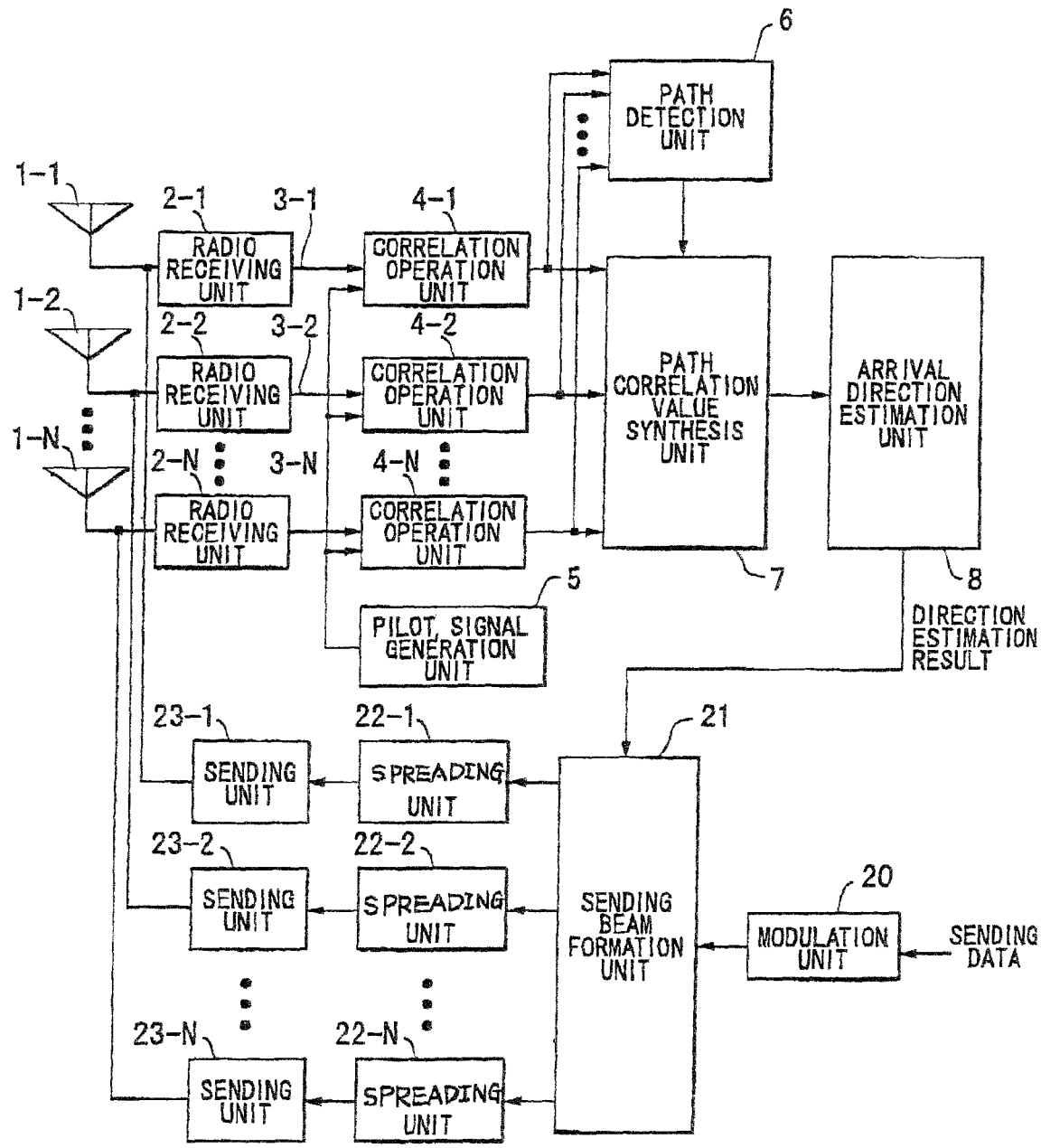
FIG. 4 is a block diagram showing the configuration of the radio communication device according to an embodiment 2 of the present invention.

FIG. 4 is a block diagram showing the configuration of forming sending directivity adaptively based on the result of the arrival direction estimation unit 8 according to Embodiment 1. The part that differs from Embodiment 1 is mainly described below.

The operation until a direction estimate is obtained in the arrival direction estimation unit 8 based on a receiving signal by the array antenna 1 is the same as Embodiment 1. In this embodiment, the operation of the arrival direction estimate unit 8 is performed as a different operation, that is, 1) when all path arrival directions are estimated in the common direction $\theta s$ and 2) multiple arrival direction estimates are output.

A modulation unit 20 modulates sending data into a predetermined modulation format. A sending beam formation unit 21 distributes the output of the modulation unit 20 into the number that is equal to the number of elements N of the array antenna 1 and multiplies each output by the elements of sending weight vector Ws=[w1, w2, ..., wn], then outputs the result. Here, 1) when all path arrival directions are estimated in the common direction $\theta s$, the sending weight vector Ws uses a steering vector $a(\theta)$ or the Chebyshev beam weight whose main beam faces toward the $\theta s$ direction.

$$W_s = a(\theta_s) \quad \text{(Formula 12)}$$

Further, 2) when multiple (Nd) arrival direction estimates $\theta k$ are output, the sending weight vector Ws uses a value in which the steering vector $a(\theta)$ is synthesized as shown in (Formula 13) or a value in which multiple Chebyshev beam weights whose main beam faces to the estimation direction are synthesized. However, k=1 to Nd.

$$W_s = \frac{1}{\sqrt{Nd}} \sum_{k=1}^{N_d} a(\theta_k) \quad \text{(Formula 13)}$$

Spreading units 22-1 to N spread an output signal from the sending beam formation unit 21 using a spreading code of a predetermined spreading coefficient and output it to sending units 23-1 to N. After the sending units 23-1 to N apply predetermined radio processing (D/A conversion and frequency up conversion) to the output of the spreading units 22-1 to N, the signal is sent to a communication terminal via the antenna 1-1 to N.

As described above, according to this embodiment, in addition to the effect of Embodiment 1, the estimate of the arrival direction estimation unit 8 can send a signal making the directivity of the array antenna 1 common to a path face toward the direction in which the composite power of multiple paths that arrive from an adjacent direction in the sending beam formation unit 21 when 1) all path arrival directions are estimated in the common direction $\theta s$. When the installation site of the array antenna 1 is sufficiently higher than the height of a peripheral building, generally, the angular spread of an arrival wave is considered to be equal or less than about 10°. Under such an environment, the application of this embodiment is very effective and the receiving characteristics of the communication terminal improves without emitting a radio wave in an unnecessary direction. Further, this embodiment can estimate a direction in which the composite power of multiple paths is maximized based on the one-time angle sweep operation in the arrival direction estimation unit 8 without estimating the arrival direction per path and can reduce throughput and an arithmetic circuit scale.

Further, the estimate of the arrival direction estimation unit 8 can form a beam facing toward multiple estimation directions in the sending beam formation 21 when 2) the multiple arrival direction estimates θk are output. When the installation site of the array antenna 1 is as high as or below the heights of surrounding buildings, generally, the angular spread of an arrival wave increases and each of the multiple paths arrive with the angular spread. In this embodiment, under such an environment, a directional beam can be formed on the path whose direction differs respectively and is provided with each spread. The communication terminal can receive a radio wave from each of the path directions and improves receiving characteristics by synthesizing and receiving the multiple paths effectively using the rake synthesis. Further this embodiment can estimate multiple path directions collectively by one-time arrival direction estimation processing. In this case, because multiple path arrival directions can be estimated from one angular spectrum, an amount of operation is reduced and its resultant device scale can be reduced.

In this embodiment, when the multiple arrival direction estimates θk are output by the arrival direction estimation unit 8, a sending weight is generated so that directivity can face toward each direction, but a directional beam may also be formed and sent only to the path direction of the maximum received power among the arrival directions of the estimated arrival path. In this case, when multiple users perform multiplex communication, the interference amount to another user can be suppressed and the communication capacity of the entire system is improved.

Further, in this embodiment, a base station device used in a communication system that uses a CDMA system as a multiple system is described, but the same shall not be limited to this device. The present invention can also apply to the base station device used in a communication system that uses a multiple system of a TDMA system or an OFDM system.

Further, the aforementioned embodiment is described assuming that multiple antennas are arranged linearly at half-wave intervals of a carrier wave. However, the same shall not be limited to this embodiment. The present invention can apply to all the base station devices that have multiple antennas and form directivity.

In the aforementioned embodiment, signals that arrive via each path were composed using the RAKE synthesis. However, the same shall not be limited to this embodiment. The present invention may also use any synthesis method as long as the method can synthesize the signal that arrives via each path per antenna.

Embodiment 3

Figure 5:
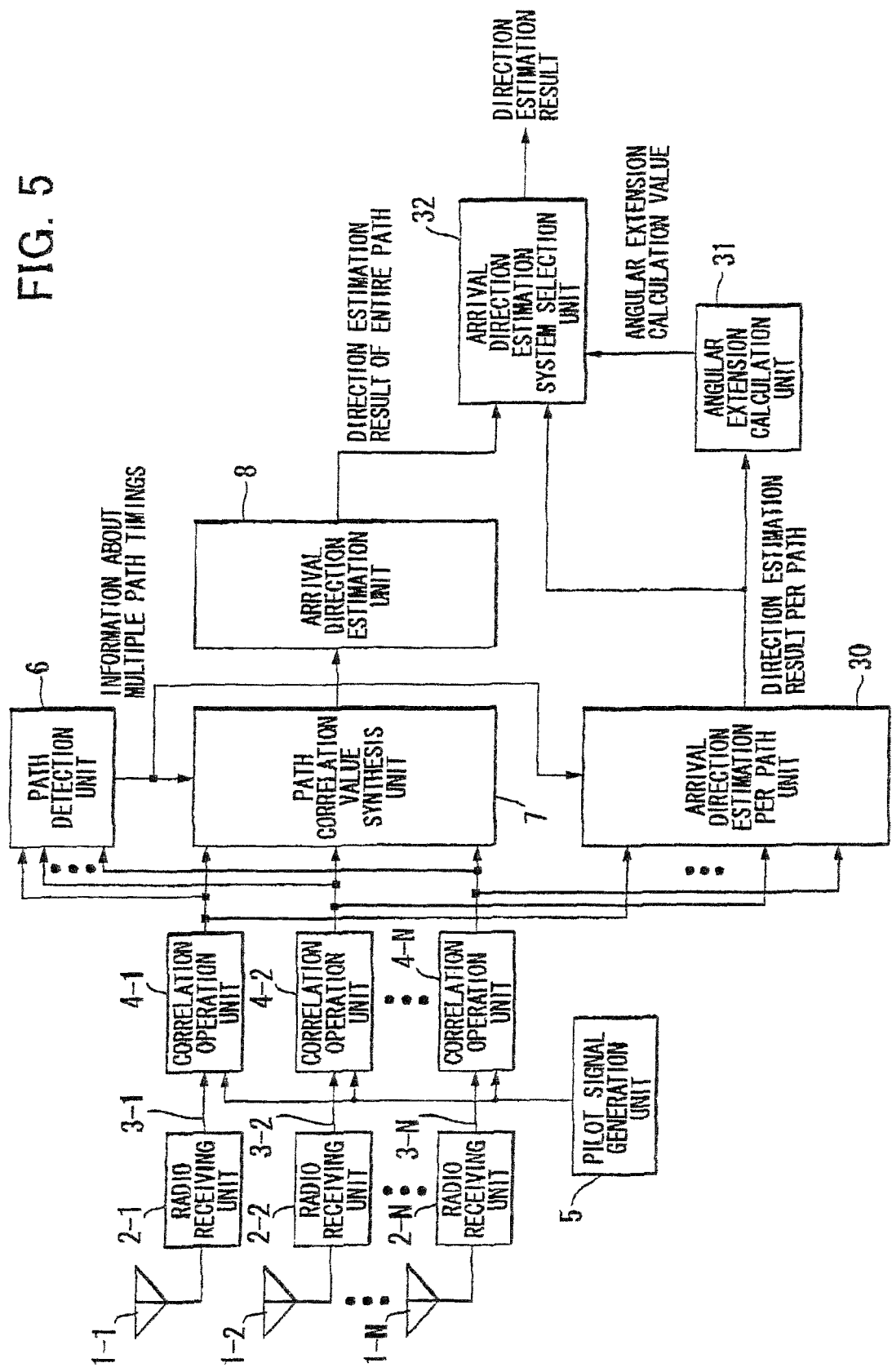
FIG. 5 is a block diagram showing the configuration of the radio communication device according to an embodiment 3 of the present invention.

FIG. 5 is a block diagram showing the configuration of a radio communication device that adds an arrival direction estimation unit 30 per path that estimates a path arrival direction in a different path receiving timing individually to the arrival direction estimation unit 8 described in Embodiment 1 and forms and receives a path receiving beam using one of these direction estimation results selectively.

Since the operation of the arrival direction estimation unit 8 is the same as that of Embodiment 1, a description will be mainly made of the operation of a newly added arrival direction estimation unit 30 per path, an angular spread calculation unit 31 that calculates an angular spread based on the direction estimation result for every path and an arrival direction estimation system selection unit 32 that selects either of the estimation result of the arrival direction estimation unit 8 or that of the arrival direction estimation unit 30 per path based on the detection result of the angular spread. The radio communication device shown in FIG. 5 applies high frequency amplification, frequency conversion, orthogonal detection and A/D conversion sequentially to high frequency signals received by the antenna elements 1-1 to N constructing the array antenna 1 in the radio receiving units 2-1 to N installed in each of the antenna elements 1-1 to N, and generates the baseband signals 3-1 to N composed of signals I and Q. However, N is the number of antenna elements.

The baseband signals 3-1 to N are input to each of the correlation operation units 4-1 to N in response to each signal respectively. The pilot signal generation unit 5 generates a known signal (hereinafter referred to as pilot signal) embedded previously in a receiving signal. The correlation operation units 4-1 to N perform a mutual correlation operation with the pilot signal. For example, for a W-CDMA communication system, after de-spreading is performed with a scrambling code and a channelization code, a correlation operation with the pilot signal embedded in every frame is performed. Here, the pilot signal is r(s). However, s=1 to Np and Np is the number of symbols for the pilot signal. The m-th correlation operation unit 4-m is expressed as the m-th baseband signal 3-m (hereinafter referred to as Xm (t); here, t indicates a sample timing). On the other hand, the correlation operation shown in (Formula 1) calculates a pilot correlation value hm(p) of each sample timing by changing a sample timing p that starts the correlation operation from 1 to Ts only by the number of times that corresponds to the number of samples Ts within the time range in which a path search is performed. No is the number of over-samples for a symbol. In addition, * indicates a complex conjugate. Accordingly, the pilot signal correlation value hm(p) in the m-th antenna element 1-m whose sample timing p is the starting point of the correlation operation is obtained. The aforementioned operation is performed for the baseband signals 3-1 to N received by all the antenna elements 1-1 to N.

The path detection unit 6 generates a delay profile based on the pilot signal correlation value hm(p) obtained by each of the correlation operation units 4-1 to N, selects high-level power paths of a predetermined number L, and outputs a selected path timing. Here, p=1 to Ts and m=1 to N. The delay profile is generated using the methods of 1) combining the absolute value or square of the pilot signal correlation value hm(p) obtained by each of the antenna elements 1-1 to N for one timing, or 2) generating multiple delay profiles by multiplying the pilot correlation value of the same timing by the weight on which a directional beam is formed, then adding both and obtaining the absolute value or square, and 3) generating delay profiles using multiple weights that differ in directivity and power-adding them.

The arrival direction estimation per path unit 30 estimates an arrival direction for each of detected L paths. The operation is described below. When the k-th arrival path receiving timing is pk, an angular spectrum is calculated by varying θ in the arrival direction estimation evaluation function GK (θ) shown in (Formula 14) in a predetermined angle step Δθ using the correlation vector Vk that includes the correlation information between the array antenna elements shown in (Formula 3). However, k=an integer of 1 to L. a(θ) is a directional vector that depends on the element arrangement of the array antenna 1 and H indicates a vector conjugate transposed operator. The peak direction $\Phi k$ in of the angular spectrum of the obtained k-th path is the arrival direction estimate of the k-th path.

$$G_k(\theta) = |V_k^H a(\theta)|^2 \qquad \text{(Formula 14)}$$

The over-sample processing is performed for a symbol rate or chip rate, the path detection unit 6 stores the phase information that results in the spatial arrangement of the array antenna 1 to some extent even for the sample adjacent to the detected arrival path receiving timing, and the direction estimation accuracy can be increased by estimating the arrival direction to which this information is added. The arrival direction estimation evaluation function Gk ($\theta$) at that time is shown in (Formula 15). A correlation matrix Uk is shown in (Formula 16) with the use of uk in (Formula 15). Herein, a correlation matrix of a predetermined sample number T adjacent before and after is added to the k-th arrival path receiving timing pk is calculated and the correlation vector of the (2T+1) is added per path. Accordingly, an operation amount increases, but the total number of sample timings (2T+1) per path is set above the number of antenna elements N. Accordingly, the number of ranks of a correlation matrix can reach the full rank. The high resolution arrival direction estimation algorithm, such as the MUSIC method and the ESPRIT method, and the arrival direction estimation algorithm using another beam former method, such as the Capon method, can be applied. Further, even if the arrival path power is low, such an effect that estimation accuracy is improved by adding a correlation vector in the adjacent timing is obtained. Further, if an array antenna is an equi-interval linear array, after spatial smoothing processing applies to the correlation matrix shown in (Formula 16), the direction estimation processing, such as the MUSIC method, ESPRIT method, Capon method, and Fourier beam former method, may also be applied. In this case, a correlation can be suppressed and the rank of a correlation matrix Uk can be recovered. The processing that reduces an amount of calculation may also be added by calculating a correlation vector rk shown on the first line of the correlation matrix Uk, calculating an angular spectrum using the arrival direction estimation evaluation function expressed by the absolute value |rk*■a($\theta$)| of the inner product between the correlation vector rk and the directional vector a($\theta$), and estimating a direction.

$$G_k(\theta) = a(\theta)^H U_k a(\theta) \qquad \text{(Formula 15)}$$

$$U_k = \sum_{n=-T}^{T} u_k^n (u_k^n)^H \qquad \text{(Formula 16)}$$

The angular spread calculation unit 31 calculates an angular spread AS using the arrival direction estimate $\Phi k$ of the obtained L paths and the arrival direction estimation evaluation function value $GK(\theta)$ of the direction and using the formula shown in (Formula 17). $\phi 0$ is shown in (Formula 18).

$$AS = \sqrt{\frac{\sum_{k=1}^{L} (\phi_k - \phi_0)^2 G_k(\phi_k)}{\sum_{k=1}^{L} G_k(\phi_k)}} \qquad \text{(Formula 17)}$$

$$\phi_0 = \frac{\sum_{k=1}^{L} \phi_k G_k(\phi_k)}{\sum_{k=1}^{L} G_k(\phi_k)} \qquad \text{(Formula 18)}$$

Since the operations of the path correlation value synthesis 7 and the arrival direction estimation unit 8 are the same as those of Embodiment 1, the description is omitted here. The arrival direction estimation system selection unit 32 selectively outputs a direction estimation result in the arrival direction estimation per path unit 30 when the angular spread AS exceeds a predetermined value based on the calculation value of the angular spread AS in the angular spread calculation unit 31. When the angular spread AS is equal to or below the predetermined value, the arrival direction estimation system selection unit 32 selectively outputs a direction estimation result in the arrival direction estimation unit 8. The predetermined value used for the comparison with the angular spread AS also depends on the number of array elements, but, for example, uses about 5° to 10°. An arrival path direction can be estimated by the aforementioned operation. The directional receiving control for an arrival path is the same as the directional receiving operation for Embodiment 1 and the description is omitted.

As described above, according to this embodiment, an arrival direction estimation system can be selected depending on the size of the angular spread obtained as a result of the arrival direction estimation per path. Accordingly, when the angular spread is smaller than the predetermined value, the path receiving beam formation unit 10 can receive a signal by making the directivity of the array antenna 1 common to a path facing toward the direction in which the composite power of the multiple paths that arrive from an adjacent direction is maximized, based on the estimation of the arrival direction estimation unit 8. Accordingly, even if the received power for every path is low, the average arrival direction of the multiple paths that arrive with an angular spread can be estimated with accuracy even for a fading fluctuation and communication can be performed with stable quality.

On the other hand, when the angular spread is larger than the predetermined value, since an environment under which an arrival path arrives from various directions is established in the periphery of communication, the arrival direction can be estimated per path with the direction estimation accuracy that responds to the received power of the arrival path. The size of the angular spread depends on the installation site of the array antenna 1 and the height of a peripheral building. In this embodiment, an arrival direction estimation system can be selected adaptively and communication can be performed with stable quality regardless of the installation site of the array antenna 1. Further, as compared with the operation in Embodiment 1, in this embodiment, because the arrival direction is estimated for every path, the communication can performed with more stable quality under the environment in which the angular spread is large.

In this embodiment, the angular spread AS calculated in the angular spread calculation unit 31 is calculated using the result of the arrival direction estimation per path unit 30, but the following two methods that differ from this can be applied.

(1) The angular spread calculation unit 31 uses the correlation matrix R or R2 calculated by the path correlation value synthesis unit 7 (Formula 2) or shown in (Formula 4) instead of the direction estimation result of the arrival direction estimation per path unit 30 as the input and calculates the maximum eigenvalue and the second largest eigenvalue of the correlation matrix, then calculates the angular spread AS= (second largest eigenvalue/maximum eigenvalue). The angular spread AS in this case sets a value of less than 1. The arrival direction estimation system selection unit 32 compares the size between the angular spread AS and the predetermined value that is smaller than 1. When the angular spread AS exceeds the predetermined value, the direction estimation result in the arrival direction estimation per path unit 30 is output selectively. When the angular spread AS is below the predetermined value, the direction estimation result in the arrival direction estimation unit 8 is output selectively.

(2) The angular spread calculation unit 31 uses the angular spectrum calculated by the arrival direction estimation unit and shown in (Formula 6) instead of the direction estimation result of the arrival direction estimation per path unit 30 as the input. When there are the multiple peak locations and those peak levels are within the range from the maximum peak level to the predetermined level, the maximum peak interval is the angular spread AS. The arrival direction estimation system selection unit 32 compares the size between the angular spread AS and the predetermined value. When the angular spread AS exceeds the predetermined value, the direction estimation result in the path arrival direction estimation unit 30 is output selectively. When the angular spread AS is below the predetermined value, the direction estimation result in the arrival direction estimation unit 8 is output selectively. In the path detection unit 6, after the output of each of the correlation operation units 4-1 to N is made average over a predetermined count (predetermined frame period), multiple arrival path receiving timings may also be detected by generating a delay profile. In this case, the follow-up for a path fluctuation deteriorates, but the path detection accuracy can be increased and the robustness of the path detection operation can be improved.

Further, in this embodiment, a base station device used in a communication system that uses a CDMA system as a multiple system is described, but the same shall not be limited to this device. The present invention can also apply to the base station device used in a communication system that uses a multiple system of a TDMA system or an OFDM system.

Further, the aforementioned embodiment is described assuming that multiple antennas are arranged linearly at half-wave length intervals of a carrier wave. The same shall not be limited to this embodiment, however. The present invention can apply to all the base station devices that have multiple antennas and form directivity.

Embodiment 4

Figure 6:
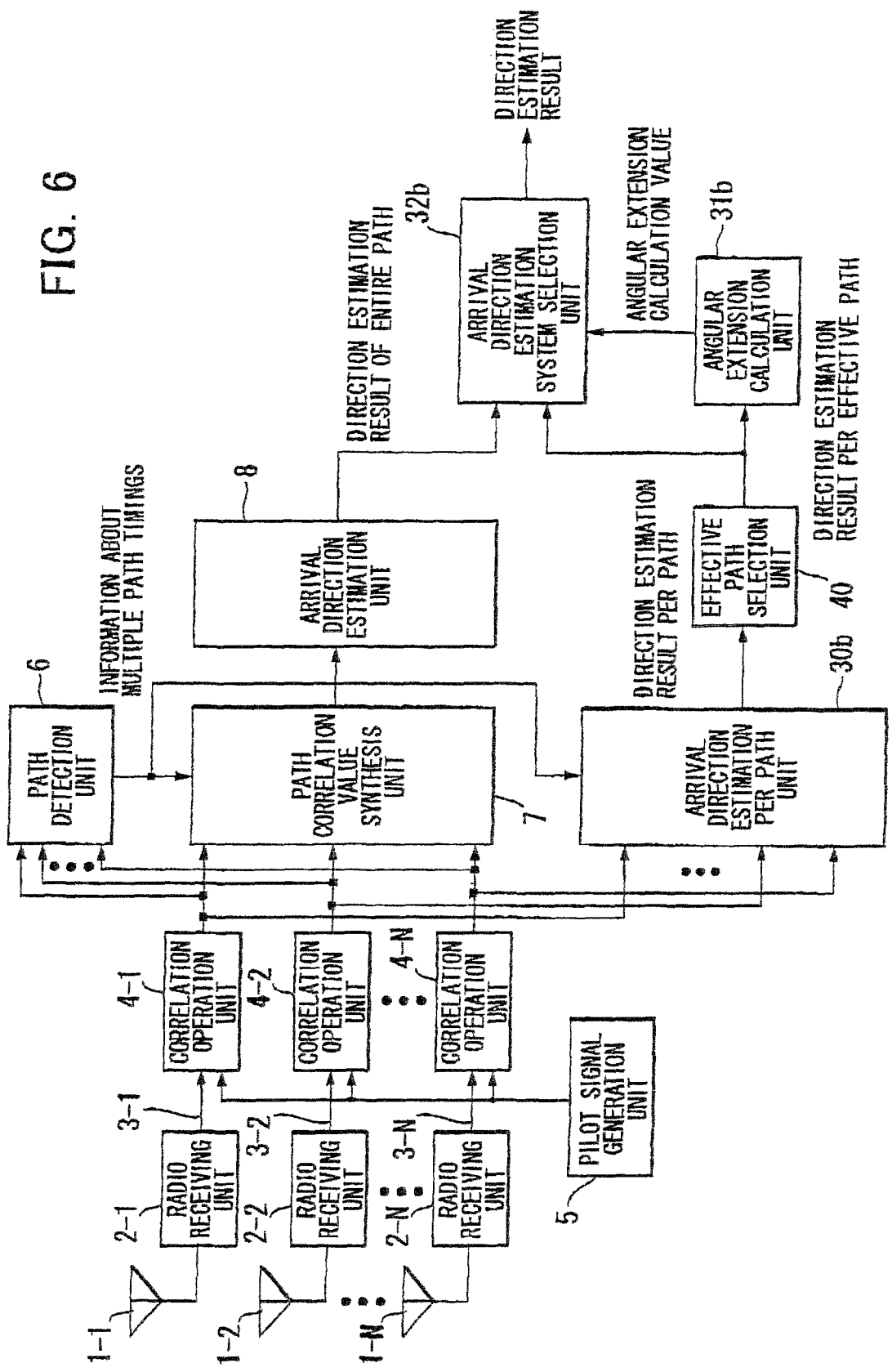
FIG. 6 is a block diagram showing the configuration of the radio communication device according to an embodiment 4 of the present invention.

FIG. 6 is a block diagram showing the configuration of a radio communication device in which a path detection unit 6b that detects multiple arrival path receiving timings exceeding the maximum number of fingers in which rake synthesis receiving is performed and an effective path selection unit 40 that selects a path within the maximum number of fingers in which rake synthesis receiving is performed from the received power when directivity is received in the arrival estimation direction for a path arrival direction estimation unit 30b in the detection path timing, is added to the configuration described in Embodiment 3. The part that differs from Embodiment 3 is mainly described below. The radio communication device shown in FIG. 6 applies high frequency amplification, frequency conversion, orthogonal detection and A/D conversion sequentially to high frequency signals received by the antenna elements 1-1 to N constructing the array antenna 1 in the radio receiving units 2-1 to N installed in each of the antenna elements 1-1 to N, and generates the baseband signals 3-1 to N composed of signals I and Q. However, N is the number of antenna elements.

The baseband signals 3-1 to N are input to each of the correlation operation units 4-1 to N in response to each signal respectively. The pilot signal generation unit 5 generates a known signal (hereinafter referred to as a pilot signal) embedded previously in a receiving signal. The correlation operation units 4-1 to N perform a mutual correlation operation with the pilot signal. For example, for a W-CDMA communication system, after de-spreading is performed with a scrambling code and a channelization code, a correlation operation with the pilot signal embedded in every frame is performed. Here, the pilot signal is r(s). However, s=1 to Np and Np is the number of symbols for the pilot signal. The m-th correlation operation unit 4-$m$ is expressed as the m-th baseband signal 3-$m$ (hereinafter referred to as Xm(t); here, t indicates a sample timing). On the other hand, the correlation operation shown in (Formula 1) calculates a pilot correlation value hm(p) of each sample timing by changing a sample timing p that starts the correlation operation from 1 to Ts only by the number of times that corresponds to the number of samples Ts within the time range in which a path search is performed. No is the number of over-samples for a symbol. In addition, * indicates a complex conjugate. Accordingly, the pilot signal correlation value hm(p) in the m-th antenna element 1-$m$ whose sample timing p is the starting point of the correlation operation is obtained. The aforementioned operation is performed for the baseband signals 3-1 to N received by all the antenna elements 1-1 to N.

The path detection unit 6b generates a delay profile based on the pilot signal correlation value hm(p) obtained in each of the cooperation units 4-1 to N, selects multiple high-level power paths of the predetermined number L in which rake synthesis is received, and outputs the selected path timings. Here, p=1 to Ts and m=1 to N. The delay profile is generated using the method of 1) composing the absolute value or square of the pilot signal correlation value hm(p) obtained in each of the antenna elements 1-1 to N or 2) generating multiple delay profiles of the same timing by the weight on which a directional beam is formed, adding both and obtaining the absolute value or square, and moreover multiple weights of different directivity, and then power-adding them.

The path arrival direction estimation unit 30b estimates an arrival direction for each of detected L paths. The operation is described below. When the k-th arrival path receiving timing is pk, an angular spectrum is calculated by varying $\theta$ in the arrival direction estimation evaluation function GK($\theta$) shown in (Formula 14) in a predetermined angle step $\Delta\theta$ using the correlation vector Vk that includes the correlation information between the array antenna elements shown in (Formula 3). However, k=an integer of 1 to L. a($\theta$) is a directional vector that depends on the element arrangement of the array antenna 1 and H indicates a vector conjugate transposed operator. The peak direction $\Phi$k in of the angular spectrum of the obtained k-th path is the arrival direction estimate of the k-th path.

The effective path selection unit 40 selects a path in the maximum number of fingers in which rake synthesis receiving of high-level received power is performed from received power Hk when directional receiving is performed in the path direction $\Phi$k (however, k=an integer of 1 to L) of arrival in the path arrival direction estimation unit 30. In this case, the received power Hk when the directional receiving is performed is shown in (Formula 19). By this operation, the path power obtained when the directional receiving is enabled in the arrival direction per path and the effective path detection performance can be increased by selecting an effective path based on this result.

$$H_k = |V_k^H a(\phi_k)|^2 \quad \text{(Formula 19)}$$

An angular spread calculation unit 31*b* calculates Q path arrival direction estimates Φk in the maximum number of fingers in which rake synthesis receiving is performed and the angular spread AS using the received power Hk obtained when the directional beam of the direction is made to face and using the formula shown in (Formula 20) from the effective path selection result of the effective path selection unit 40.

$$AS = \sqrt{\frac{\sum_{k=1}^{Q} (\phi_k - \phi_0)^2 H_k}{\sum_{k=1}^{Q} H_k}} \quad \text{(Formula 20)}$$

$$\phi_0 = \frac{\sum_{k=1}^{Q} \phi_k H_k}{\sum_{k=1}^{Q} H_k} \quad \text{(Formula 21)}$$

Since the operations of the path correlation value synthesis 7 and the arrival direction estimation unit 8 are the same as those of Embodiment 1, the description is omitted here. An arrival direction estimation system selection unit 32*b* selectively outputs a direction estimation result in the effective path selection unit 40 when the angular spread AS exceeds a predetermined value based on the calculation value of the angular spread AS in the angular spread calculation unit 31*b*. When the angular spread AS is below the predetermined value, the direction estimation result in the arrival direction estimation unit 8 is output selectively. The predetermined value used for the comparison with the angular spread also depends on the number of array elements, but, for example, uses about 5° to 10°.

An arrival path direction can be estimated by the aforementioned operation. The directional receiving control for an arrival path is the same as the directional receiving operation for embodiment 1 and the description is omitted.

As described above, according to this embodiment, in addition to the effect of Embodiment 3, the arrival direction per path of the number that exceeds the maximum number of fingers in which rake receiving is performed can be estimated by detecting the arrival path receiving timing that exceeds the maximum number of fingers in the path detection unit 6*b*. Accordingly, since an effective path in the maximum number of fingers in which the rake receiving is performed can be selected based on the path power that can be received when a directional beam is made to face toward the arrival direction per path, the effective path selection performance, that is, the path search performance can be increased. Then receiving performance can be increased by the path search performance.

Although, in this embodiment, the angular spread AS is calculated in the angular spread calculation unit 31*b* using the result of the effective path selection unit 40, the following two methods that differ from this can be applied.

(1) The angular spread calculation unit 31*b* uses the correlation matrix R or R2 calculated by the path correlation value synthesis unit 7 (Formula 2) or shown in (Formula 4) instead of the direction estimation result of the effective path selection unit 40 as the input and calculates the maximum eigenvalue and the second largest eigenvalue of the correlation matrix, then calculates the angular spread AS=(second large eigenvalue)/(maximum eigenvalue). The angular spread AS at this case sets a value of less than 1. The arrival direction estimation system selection unit 32*b* compares the size with a predetermined value that is smaller than the angular spread and 1. When the angular spread AS exceeds the predetermined value, the direction estimation result in the effective path selection unit 40 is output selectively. When the angular spread AS is equal to or below the predetermined value, the direction estimation result in the arrival direction estimation unit 8 is output selectively.

(2) The angular spread calculation unit 31*b* uses the angular spectrum calculated by the arrival direction estimation unit and shown in (Formula 6) instead of the direction estimation result of the effective path selection unit 40 as the input. When there are the multiple peak locations and those peak levels are within the range from the maximum peak level to the predetermined level, the maximum peak interval is the angular spread AS. The arrival direction estimation system selection unit 32*b* compares the size between the angular spread AS and the predetermined value. When the angular spread AS exceeds the predetermined value, the direction estimation result in the effective path selection unit 40 is output selectively. When the angular spread AS is equal to or below the predetermined value, the direction estimation result in the arrival direction estimation unit 8 is output selectively.

In the path detection unit 6, after the output of each of the correlation operation units 4-1 to N is made average over a predetermined count (predetermined frame period), multiple arrival path receiving timings may also be detected by generating a delay profile. In this case, the follow-up for a path fluctuation deteriorates, but the path detection accuracy can be increased and the robustness of the path detection operation can be improved.

Further, in this embodiment, a base station device used in a communication system that uses a CDMA system as a multiple system is described, but the same shall not be limited to this device. The present invention can also apply to the base station device used in a communication system that uses a multiple system of a TDMA system or an OFDM system.

Further, the aforementioned embodiment is described assuming that multiple antennas are arranged linearly at half-wave length intervals of a carrier wave. The same shall not be limited to this embodiment, however. The present invention can apply to all the base station devices that have multiple antennas and form directivity.

The present invention is described based on desirable embodiments shown in the drawings, but it is clear that a person skilled in the art can easily make various modifications and alternations without overstepping the ideas of the present invention. The present invention contains such examples of modifications.

What is claimed is:

1. A path receiving beam formation device comprising:
   an array antenna composed of multiple antenna elements;
   multiple correlation operation units that perform mutual correlation operation between signals received by the respective antenna elements of said array antenna and a predetermined signal so as to calculate first correlation operation values;
   a path detection unit that detects a plurality of arrival path receiving timings based on the multiple first correlation operation values;
   a path correlation value synthesis unit that calculates complex conjugates of the multiple first correlation operation values at said detected arrival path receiving timings and generates a correlation matrix using the multiple first correlation operation values and the multiple complex conjugates; and a path receiving beam formation unit that forms a directional beam using the path receiving weight composed of the product between the inverse matrix being based on the correlation matrix and a correlation vector having the multiple correlation operation value at the arrival path receiving timing as an element.

2. The path receiving beam formation device according to claim 1, wherein said path detection unit detects the multiple arrival path receiving timings using a delay profile generated based on the multiple first correlation operation values.

3. The path receiving beam formation device according to claim 1, wherein the correlation matrix generated by the path correlation value synthesis unit is the matrix or the vector by each path.

4. The path receiving beam formation device according to claim 1, wherein the path detection unit detects the multiple arrival path receiving timings using the delay profile generated based on the multiple first correlation operation values which are made average over a predetermined count.

5. The path receiving beam formation device according to claim 1, wherein the correlation matrix is synthesized by using the multiple first correlation operation values and multiple second correlation operation values at timings adjacent before and after the multiple arrival path receiving timings.

* * * * *